March 25, 1969          E. J. WELLER                3,434,553
                        DRILL CUTTER BIT
                      Filed March 8, 1967

INVENTOR
ELBERT J. WELLER
BY Harold J. Holt.
ATTORNEY

United States Patent Office 3,434,553
Patented Mar. 25, 1969

3,434,553
DRILL CUTTER BIT
Elbert J. Weller, Detroit, Mich., assignor to General Electric Company, a corporation of New York
Filed Mar. 8, 1967, Ser. No. 621,620
Int. Cl. E21c *13/01*
U.S. Cl. 175—410          2 Claims

ABSTRACT OF THE DISCLOSURE

The end of the tubular drill shaft used, for example, in rock drilling is bent and configured to support and receive a cutter insert directly, thereby eliminating the use of a separate holder upon which the cutter is normally mounted. The end of the drill shaft is also configured to form a passage to the interior of the shaft for dust removal.

Background of the invention

In drilling into rock, such as in mine drilling, it is conventional to use a hard carbide cutter insert mounted upon a holder, which in turn is fastened to the end of a hollow, tubular shaft which is powered for rotation. The shaft is conventionally provided with openings near the holder so that dust may be removed by applying a vacuum to the opposite end of the hollow shaft, or alternatively, coolant fluids may be flowed through the shaft and openings for both cooling the insert and removing drill dust. In such type drills, it is desirable to locate the dust-collecting holes or openings as close to the cutter insert as possible for efficient operation. However, there is a limit as to the location of such openings, since being located on the opposite side of the holder from which the cutter is positioned, a relatively considerable distance between the openings and cutter results.

In addition, the holders used for such drills have been relatively expensive and require the stocking and handling of an extra part solely for fastening the cutter to the tubular drill shaft.

Hence, it is an object of this invention to eliminate the separate holder altogether, and instead to form the holder on the end of a drill shaft or on the end of a tube which may be fastened to the drill shaft, wherein the tubular holder end is bent and configured to form side support walls to receive and hold the cutter and at the same time is bent to form ducts at the sides of the cutter insert immediately adjacent to the cutting edges.

A further object is to locate supplemental holes in the tube in a tapered area a short distance from the cutter insert to additionally receive fluid, such as dust-laden air.

Summary of the invention

Briefly stated, this invention relates to a drill cutter bit comprising a plate-like carbide cutter insert mounted upon a holder formed on the end of a hollow tube by means of bending the tube wall into two parallel side support walls between which the insert is positioned, and further outwardly bowing a portion of each of said support walls to form ducts opening at the end of the tube, at the opposite sides of the insert, and communicating with the hollow interior of the tube for conducting fluid such as dust-laden air, for dust removal, or coolant liquid.

Brief description of the drawings

The invention will be more clearly understood from the following description, of which the attached drawings form a part.

In these drawings.

Description of the preferred embodiment

Figure 1:
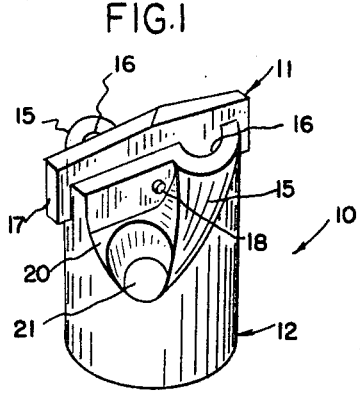
FIGURE 1 is a perspective elevational view of the cutter insert removed.
Figure 3:
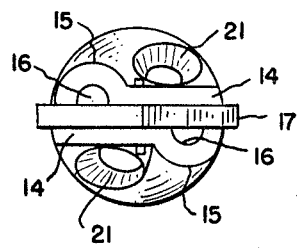
FIGURE 3 is an end, plan view of the assembled cutter bit.
Figure 2:
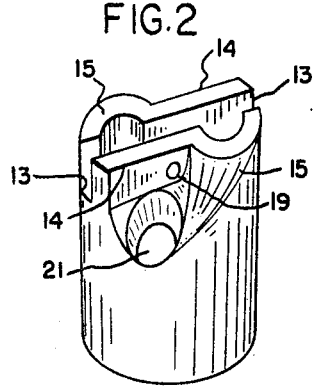
FIGURE 2 is a view similar to FIG. 1 but with the cutter insert removed.
Figure 4:
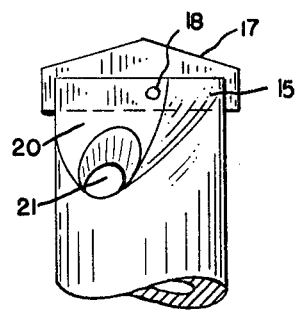
FIGURE 4 is a front elevational view thereof.

Referring to the drawings, the drill cutter bit 10 is formed on the end 11 of a tube 12 which may be either the tubular, rotary powered drill shaft, or drill steel as it is called, used in rock drilling, or may be a separate tube for joining to such a shaft.

A carbide cutter insert socket is formed on the end 11 by notching the opposite sides of the tube end at 13 and then bending the tube end wall to form two straight, side support walls 14 and an outwardly bowed portion 15 which forms a duct 16 closed on one side by the cutter insert 17 which is fitted into the space between the two side walls 14. The bottom of the insert is supported upon the bottoms of the notches 13. The insert 17 may be brazed between the walls 14 or otherwise permanently secured in place or preferably loosely held between the walls by means of a pin 18 extending through aligned openings 19 formed in the walls 14 and an opening formed in the insert. By using an undersized pin relative to the openings, the insert may move slightly within its supporting socket for self centering.

Where further openings are desirable in the tube for dust collecting or fluid flow, the tube, a short distance from the walls 14, is tapered back to the tube diameter to form a tapered portion 20, and in that tapered portion on each side of the tube a dust-collecting opening 21 is formed. The invention has the added advantage of placing the dust-collection opening in closer proximity to the cutting edge than would normally result with a conventional cutter bit. In addition, the opening in the drill shaft can be punched or press-formed rather than machined, as would be necessary with a conventional bit. This permits greater latitude in the hole geometry, i.e., the opening can be elongated radially in a direction along the insert, thus permitting improved dust removal, whereas a machined hole would normally be round.

In operation, when the drill is operated in rock, a vacuum may be applied to the opposite end of the tube to suck in, through the duct 16 and openings 21, the dust-laden air, thereby clearing the drilled hole at the cutter insert. Alternatively, a coolant fluid may be flowed in through the tube and openings and ducts to thereby cool the insert and at the same time wash away the drill dust and chips.

When the insert becomes worn, if it is assembled by means of a pin as described above, it may be removed and replaced. Where it is permanently assembled, either the entire tube is replaced or the insert may be removed and the new insert fixed into position as by brazing or the like.

I claim:

1. A cutter bit comprising a hollow tube, a pair of opposed notches formed in one end of the tube, and a plate-like hard, cutter insert arranged diametrically transversely of said tubed end within said notches and extending outwardly of the end of the tube to form a cutter edge, the tube wall on opposite sides of the insert being collapsed inwardly to form a pair of straight, side support walls, defining an insert-receiving channel therebetween for supporting the opposite faces of the insert along a major portion thereof, a portion of each of said support walls being bent outwardly away from the insert to form a duct on each side end of the insert at diametrically opposite locations relative to each other, with the ducts opening at the free end of the tube and communicating with the interior of the tube.

2. A cutter bit as defined in claim 1, each of said side support walls being tapered into the circular wall of the tube at a location near the insert, with an opening formed in the tube wall in each of said tapered areas for receiving dust-collecting fluid, said openings and said ducts together providing for dust removal along a substantial portion of both faces of the cutter insert.

References Cited

UNITED STATES PATENTS

| | | | |
|---|---|---|---|
| 764,664 | 7/1904 | Jones | 175—327 |
| 1,786,414 | 12/1930 | Kennedye | 175—413 |
| 2,575,239 | 11/1951 | Stevens | 175—418 X |
| 2,597,771 | 5/1952 | Bergstrom | 175—417 X |
| 2,673,714 | 3/1954 | Hargrave | 175—410 X |
| 3,032,129 | 5/1962 | Fletcher et al. | 175—410 X |
| 3,089,552 | 5/1963 | Black et al. | 175—410 X |

FOREIGN PATENTS 945,836  7/1956  Germany.

CHARLES E. O'CONNELL, *Primary Examiner.*

R. E. FAVREAU, *Assistant Examiner.*

U.S. Cl. X.R.

175—418